US011657593B2

(12) United States Patent
Kluckner et al.

(10) Patent No.: US 11,657,593 B2
(45) Date of Patent: May 23, 2023

(54) DEEP LEARNING VOLUME QUANTIFYING METHODS AND APPARATUS

(71) Applicant: Siemens Healthcare Diagnostics Inc., Tarrytown, NY (US)

(72) Inventors: Stefan Kluckner, Berlin (DE); Yao-Jen Chang, Princeton, NJ (US); Kai Ma, West Windsor, NJ (US); Vivek Singh, Princeton, NJ (US); Terrence Chen, Princeton, NJ (US); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 379 days.

(21) Appl. No.: 16/634,541

(22) PCT Filed: Jul. 25, 2018

(86) PCT No.: PCT/US2018/043745
§ 371 (c)(1),
(2) Date: Jan. 27, 2020

(87) PCT Pub. No.: WO2019/023376
PCT Pub. Date: Jan. 31, 2019

(65) Prior Publication Data
US 2020/0265263 A1 Aug. 20, 2020

Related U.S. Application Data

(60) Provisional application No. 62/538,460, filed on Jul. 28, 2017.

(51) Int. Cl.
*G06K 9/62* (2022.01)
*G06T 7/62* (2017.01)
(Continued)

(52) U.S. Cl.
CPC ..... *G06V 10/454* (2022.01); *G01N 35/00613* (2013.01); *G01N 35/04* (2013.01);
(Continued)

(58) Field of Classification Search
CPC ................. G06K 9/628; G06K 9/6274; G01N 35/00613; G01N 35/04; G01N 35/00732;
(Continued)

(56) References Cited

U.S. PATENT DOCUMENTS 6,743,398 B2  6/2004 Itoh
7,422,693 B2  9/2008 Carter et al.
(Continued)

FOREIGN PATENT DOCUMENTS

CA  2976769 A1  8/2016
CN  1546993 A  11/2004
(Continued)

OTHER PUBLICATIONS

PCT International Search Report and Written Opinion dated Oct. 12, 2018 (8 Pages).
(Continued)

*Primary Examiner* — Wesley J Tucker

(57) ABSTRACT

A neural network-based method for quantifying a volume of a specimen. The method includes providing a specimen, capturing images of the specimen, and directly classifying to one of a plurality of volume classes or volumes using a trained neural network. Quality check modules and specimen testing apparatus adapted to carry out the volume quantification method are described, as are other aspects.

20 Claims, 10 Drawing Sheets

(51) Int. Cl.
*G01N 35/00* (2006.01)
*G01N 35/04* (2006.01)
*G06V 10/44* (2022.01)
*G06F 18/2431* (2023.01)
*G06V 10/764* (2022.01)
*G06V 10/82* (2022.01)
*G06V 20/69* (2022.01)

(52) U.S. Cl.
CPC ............ *G06F 18/2431* (2023.01); *G06T 7/62* (2017.01); *G06V 10/764* (2022.01); *G06V 10/82* (2022.01); *G06V 20/69* (2022.01); *G01N 35/00732* (2013.01); *G01N 2035/0441* (2013.01); *G06T 2207/10016* (2013.01); *G06T 2207/20084* (2013.01)

(58) Field of Classification Search
CPC .............. G01N 2035/0441; G06T 7/62; G06T 2207/10016; G06T 2207/20084; G06V 10/454; G06V 10/82; G06V 20/69
See application file for complete search history.

(56) References Cited

U.S. PATENT DOCUMENTS

| | | | |
|---|---|---|---|
| 7,982,201 | B2 | 7/2011 | Bryant et al. |
| 8,194,235 | B2 | 6/2012 | Kosaka et al. |
| 8,792,693 | B2 | 7/2014 | Satish |
| 9,739,783 | B1* | 8/2017 | Kumar ............ G01N 33/57492 |
| 10,746,665 | B2 | 8/2020 | Kluckner et al. |
| 10,746,753 | B2 | 8/2020 | Kluckner et al. |
| 10,816,538 | B2 | 10/2020 | Kluckner et al. |
| 10,928,310 | B2 | 2/2021 | Wissmann et al. |
| 11,042,788 | B2 | 6/2021 | Kluckner et al. |
| 11,238,318 | B2* | 2/2022 | Sun ...................... G06K 9/6217 |
| 2002/0097388 | A1* | 7/2002 | Raz ...................... G02B 21/365 356/39 |
| 2012/0016818 | A1* | 1/2012 | Hackett ................. G06V 20/69 706/12 |
| 2012/0140230 | A1 | 6/2012 | Miller |
| 2013/0010094 | A1 | 1/2013 | Satish et al. |
| 2013/0034284 | A1 | 2/2013 | Honkanen et al. |
| 2015/0347817 | A1* | 12/2015 | Valvik .................. H04N 13/296 382/133 |
| 2017/0140524 | A1* | 5/2017 | Karsenti .............. G06K 9/6287 |
| 2018/0353952 | A1 | 12/2018 | Olson |
| 2019/0033209 | A1 | 1/2019 | Kluckner et al. |
| 2020/0151498 | A1* | 5/2020 | Sun ...................... G06K 9/6289 |
| 2020/0158745 | A1* | 5/2020 | Tian ...................... G06V 10/143 |
| 2021/0064927 | A1* | 3/2021 | Kluckner .............. G06K 9/6274 |
| 2021/0164965 | A1* | 6/2021 | Ma .......................... G06T 7/174 |
| 2021/0270722 | A1* | 9/2021 | Chou .................... G16H 30/40 |
| 2021/0295960 | A1* | 9/2021 | Kalkstein ............... G16H 10/40 |
| 2022/0057336 | A1* | 2/2022 | Pearson ................. H04N 5/247 |

FOREIGN PATENT DOCUMENTS

| | | |
|---|---|---|
| CN | 1838130 A | 9/2006 |
| CN | 102037343 A | 4/2011 |
| CN | 106651830 A | 5/2017 |
| JP | H11-088898 A | 3/1999 |
| JP | 2005017245 A | 1/2005 |
| JP | 2007-524838 A | 8/2007 |
| JP | 2013-501937 A | 1/2013 |
| JP | 2014-504731 A | 2/2014 |
| WO | 2011/019576 A1 | 2/2011 |
| WO | 2016/133900 A1 | 8/2016 |
| WO | 2017/053592 A1 | 3/2017 |
| WO | 2017/100798 A1 | 6/2017 |
| WO | WO-2017100798 A1 * | 6/2017 ............ B01D 21/26 |
| WO | 2017132171 A1 | 8/2017 |

OTHER PUBLICATIONS

Extended EP Search Report dated Jul. 21, 2020 of corresponding European Application No. 18837576.0, 4 Pages.

Vickram A. S. et al: "Prediction of Zn concentration in human seminal plasma of Normospermia samples by Artificial Neural Networks (ANN)", Journal of Assisted Reproduction and Genetics., vol. 30, No. 4, Jan. 11, 2013 (Jan. 11, 2013), pp. 453-459, XP055712336,US, ISSN: 1058-0468, DOI: 10.1007/sl0815-012-9926-4.

Ewerlof Maria et al: "Spatial and temporal skin blood volume and saturation estimation using a multispectral snapshot imaging camera", Progress in Biomedical Optics and Imaging, SPIE—International Society for Optical Engineering, Bellingham, WA, US, vol. 10068, Feb. 16, 2017 (Feb. 16, 2017), pp. 1006814-1006814, XP060085873, ISSN: 1605-7422, DOI: 10.1117/12.2251928 ISBN: 978-1-5106-0027-0.

* cited by examiner

| Volume Class | Volume Value (ml) |
|---|---|
| SPP1 | 0.5 ml |
| SPP2 | 1.0 ml |
| SPP3 | 1.5 ml |
| SPP4 | 2.0 ml |
| SPP5 | 2.5 ml |
| SPP6 | 3.0 ml |
| SPP7 | 3.5 ml |
| SPP8 | 4.0 ml |
| SPP9 | 4.5 ml |
| ... | ... |
| SPPn | x ml |

DEEP LEARNING VOLUME QUANTIFYING METHODS AND APPARATUS

CROSS-REFERENCE TO RELATED APPLICATIONS

This application claims priority to U.S. provisional application Ser. No. 62/538,460 filed on Jul. 28, 2017, the contents of which is incorporated herein by reference in its entirety.

FIELD

The present disclosure relates to methods and apparatus for testing of a specimen, and, more particularly, to methods and apparatus for determining an amount of one or more components in a specimen.

BACKGROUND

Automated testing systems may conduct assays or clinical analysis using one or more reagents to identify an analyte or other constituent in a specimen such as urine, blood serum, blood plasma, interstitial liquid, cerebrospinal liquids, and the like. For convenience and safety reasons, such specimens are usually contained within specimen containers (e.g., specimen collection tubes). The testing reactions generate various changes that may be read and/or manipulated to determine a concentration of analyte or other constituent contained in the specimen, that may in some embodiments be indicative of a patient's disease state.

Improvements in automated testing technology have been accompanied by corresponding advances in pre-analytical specimen preparation and handling operations such as sorting, batch preparation, centrifuging of specimen containers to separate specimen components, cap removal to facilitate fluid access, and the like by automated specimen preparation systems called Laboratory Automation Systems (LASs). LASs may also automatically transport a specimen in a specimen container to a number of specimen processing stations so that various operations (e.g., pre-analytical or analytical tests) can be performed thereon.

LASs may handle a number of different specimens contained in standard, barcode-labeled specimen containers, which may be of different sizes (e.g., diameters and heights). The barcode label may contain an accession number that may contain or be correlated to patient information other information that may have been entered into a hospital's Laboratory Information System (LIS) along with test orders. An operator may place the labeled specimen containers onto the LAS system, which may automatically route the specimen containers for pre-analytical operations such as centrifugation, de-capping, and/or aliquot preparation, and all prior to the specimen actually being subjected to clinical analysis or assaying by one or more analyzers (clinical chemistry or assaying instruments) that may also be part of the LAS.

For certain tests, a biological liquid such as a serum or plasma portion (obtained from whole blood by centrifugation) may be subjected to analysis. In the case where the specimen is whole blood, a gel separator may be added to the specimen container to aid in the separation of a settled blood portion from the serum or plasma portion. After pre-processing, the specimen container may be transported to an appropriate analyzer that may extract a portion of the biological fluid (e.g., serum or plasma portion) of the specimen from the specimen container and combine the fluid with one or more reagents and possibly other materials in a reaction vessel (e.g., cuvette). Analytical measurements may then be performed by using photometric or fluorometric absorption readings, using a beam of interrogating radiation, or the like. The measurements allow determination of endpoint or rate or other values, from which an amount of analyte or other constituent in the biological fluid is determined using well-known techniques. It is advantageous to know the volume of the biological fluid present in the specimen container so that it may be determined if there is sufficient fluid present to conduct the ordered tests, but such volume may also be used in some cases to indicate information concerning a disease state of the patient.

In some biological fluids, a demarcation between the various portions (e.g., settled portion, serum or plasma portion, and gel separator (if used)) in the specimen may be difficult to determine using existing methods. Thus, the volume of the resultant serum or plasma portion or the relative amounts of settled blood portion (SBP) and serum or plasma portion (SPP) may be difficult to determine. Moreover, accurately determining a volume of the biological fluid contained in the specimen container is challenging when there are so many different types and sizes of specimen containers being presented to the LAS. Moreover, exacerbating this situation is that in certain instances, the biological fluid may be fully or partially hidden from view by one or more information-containing labels.

To combat this label occlusion problem, some systems such as those described in US Pat. Pub. No. 2012/0140230 to Miller describe rotating the specimen container to find a view window that is unobstructed by the label and then measuring the relative amounts of the components using an optical imaging system. However, such systems may be less prone to ease of automation.

Because of the difficulties encountered in determining the amounts of the various components contained in the specimen, there is an unmet need for a method and apparatus adapted to readily determine a volume of one or more components of a biological fluid.

SUMMARY

According to a first aspect, a method of quantifying a specimen contained within a specimen container is provided. The method includes providing a specimen container at an imaging location, the specimen container containing the specimen, capturing multiple high dynamic range images of the specimen and storing the multiple high dynamic range images as image data, operating on the image data with a neural network, and classifying the specimen with the neural network into one of: a plurality of volume classes, and a volume of the specimen.

According to another aspect, a quality check module adapted to quantify a volume of a specimen is provided. The quality check module includes one or more image capture devices configured to capture images of the specimen at multiple spectra having different nominal wavelengths, at multiple exposures, and from one or more viewpoints; and a computer operatively coupled to the one or more image capture devices and operable to: select optimally-exposed pixels from the images at the different exposures and at each of the multiple spectra and generate optimally-exposed image data for each of the multiple spectra, operate on the image data with a neural network; and classify the specimen with the neural network into one of: a plurality of volume classes, and a volume of the specimen.

In yet another aspect, a specimen testing apparatus is provided. The specimen testing apparatus includes a track, and a quality check module on the track. The quality check module includes one or more image capture devices configured to capture images of the specimen at multiple spectra having different nominal wavelengths, at multiple different exposures, and from one or more viewpoints, and a computer configured and operable to: select optimally-exposed pixels from the images at the multiple different exposures at each of the multiple spectra to generate optimally-exposed image data for each of the multiple spectra and one or more viewpoints, and operate on the image data with a neural network to classify the specimen with the neural network into one of: a plurality of volume classes, and a volume of the specimen.

Still other aspects, features, and advantages of the present invention may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present disclosure. Accordingly, the drawings and descriptions are to be regarded as illustrative in nature, and not as restrictive. The disclosure is to cover all modifications, equivalents, and alternatives falling within the scope of the claims.

BRIEF DESCRIPTION OF THE DRAWINGS

The drawings, described below, are for illustrative purposes only and are not necessarily drawn to scale. The drawings are not intended to limit the scope of the invention in any way.

DETAILED DESCRIPTION

Figure 1:
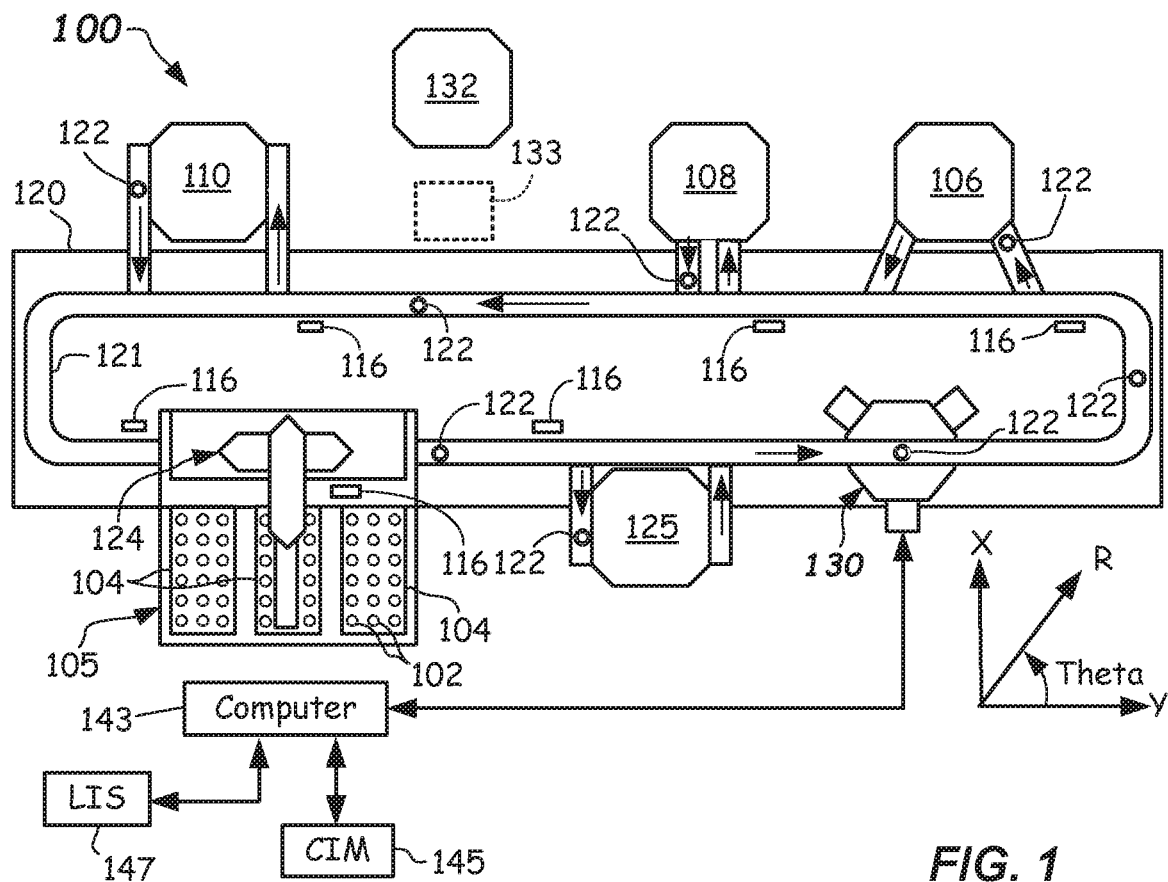
FIG. 1 illustrates a top schematic view of a specimen testing apparatus including one or more quality check modules configured to determine specimen volume and one or more analyzers according to one or more embodiments.

In a first broad aspect, embodiments of the present disclosure provide apparatus, systems, and methods that are configured and operable to quantify volume characteristics of one or more components of a specimen. In particular, the apparatus, systems, and methods are configured and operable to determine volume of a serum or plasma portion, a settled blood portion, or a gel separator (if used). By precisely knowing the volume of the serum or plasma portion, this allows for a pre-check or verification that there will be a sufficient amount of the serum or plasma portion present in the specimen container in order to carry out tests when multiple tests are ordered on a particular specimen. Accurately knowing the volume characteristics of the serum or plasma portion and the settled blood portion also enables generation of a ratio there between, which can be indicative of disease condition of the patent. Similarly, knowing the volume of the settled blood cell portion can also be indicative of a patient's disease state.

The specimen, as described herein, may be collected in a specimen container, such as a blood collection tube and includes a settled blood portion and a serum and plasma portion after separation (e.g., fractionation using centrifugation). The settled blood portion is made up blood cells such as white blood cells (leukocytes), red blood cells (erythrocytes) and platelets (thrombocytes), which are aggregated and separated from the serum or plasma portion. Settled blood portion is generally found at the bottom part of the specimen container. The serum or plasma portion is the liquid component of blood, which is not part of the settled blood portion. It is generally found above the settled blood portion. Plasma and serum differ primarily in the content of coagulating components, primarily fibrinogen. Plasma is the un-clotted liquid, whereas serum refers to blood plasma that has been allowed to clot to some extent, either under the influence of endogenous enzymes or exogenous components. In some specimen containers, a gel separator (e.g. plug) may be used, which positions itself between the settled blood portion and the serum or plasma portion during fractionation. It serves as a barrier between the two portions and prevents remixing thereof.

In accordance with one or more embodiments, the specimen quantification method may be carried out as a pre-analytical testing method (i.e., as a pre-screening method). For example, in one or more embodiments, the specimen quantification method may be carried out along with the specimen being characterized for the presence of an interferent, or prior to be subjected to routine analysis on an analyzer. In particular, one or more embodiments of the present disclosure provides for volume quantification of a specimen as a prerequisite for further analytical testing. The volume quantification of the specimen may be determined at a quality check module, as is described herein. The quality check module is a device that enables a check of one or more aspects of the specimen or specimen container that relate generally to the overall quality of the specimen or container that may have bearing on the ordered test(s) or the patient's disease condition. The quality check module may include one or more image capture devices (e.g., multiple digital cameras or the like) arranged to provide one or more digital images of the specimen container, such as images from different lateral viewpoints.

As a main goal, the quantification method involves precise and rapid quantification of a volume of the serum or plasma portion and possibly other components of the specimen (e.g., settled blood portion and/or gel separator). The volume quantification may be carried out using high dynamic range (HDR) image processing in some embodiments. In accordance with one advantageous aspect, the volume quantification may be carried out directly from the image data without a segmentation step.

After the volume quantification method has determined the volume of one or more components present in the specimen, the generated HDR data sets may be used to determine further information about the specimen, such as to determine a presence of an interferent, such as hemolysis, icterus, and/or lipemia (hereinafter "HIL") in the serum or plasma portion.

In some embodiments, a quality check module is configured to carry out the direct volume quantification method. The quality check module may be provided as part of a laboratory automation system (LAS) where a track transports the specimen to the one or more analyzers, and the quality check module may be provided on or adjacent to the track in between a specimen loading station and the one or more analyzers. In a specific embodiment, the quality check module is provided on the track, such as at the specimen loading station or at another position along the track, so that the specimen may be volume quantified while on the track.

The volume quantification method including HDR data processing may include capturing multiple images at the quality check module at multiple exposures (e.g., exposure times) and while being successively illuminated by multiple spectra having different nominal wavelengths. Multiple images may be obtained using a plurality of image capture devices arranged to capture the images from different viewpoints in some embodiments. Taking the one or more images at multiple spectra (e.g., colors) may be accomplished using while using different light sources for illumination (e.g., backlighting of the specimen). For example, red light sources (R), green light sources (G), and blue light sources (B) may be used. Alternatively, or additionally, white light sources (WL), near-infrared (NIR) or infrared (IR) light sources, and/or ultraviolet light sources (UV) may be used.

Images at multiple exposures for each spectrum may be obtained by the quality check module. For example, 4-8 or more images at different exposures may be obtained at each spectrum. The exposure may vary based on the lighting intensity and features of the image capture device.

Further details of the specimen direct volume quantification methods, quality check modules configured to carry out the volume quantification methods, and specimen testing systems including one or more of the quality check modules will be further described with reference to FIGS. 1-8 herein.

Figure 2:
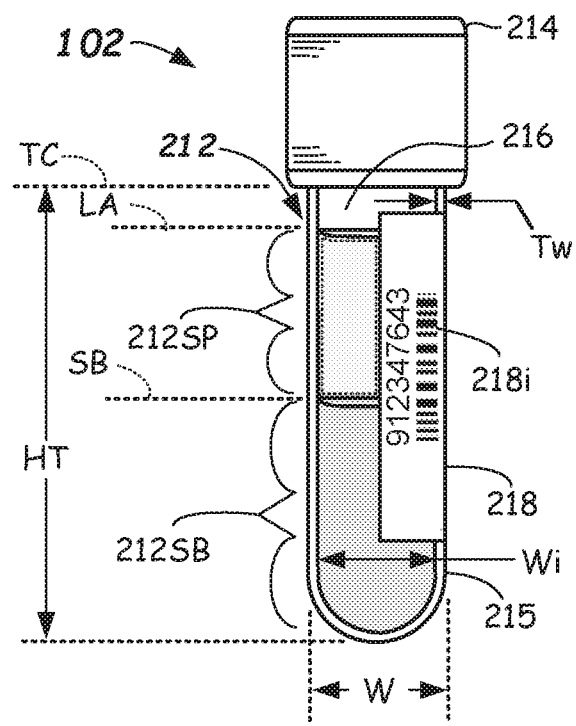
FIG. 2 illustrates a side view of a labeled specimen container including a specimen, which may be volume quantified by using a specimen volume quantification method according to one or more embodiments.
Figure 3A:
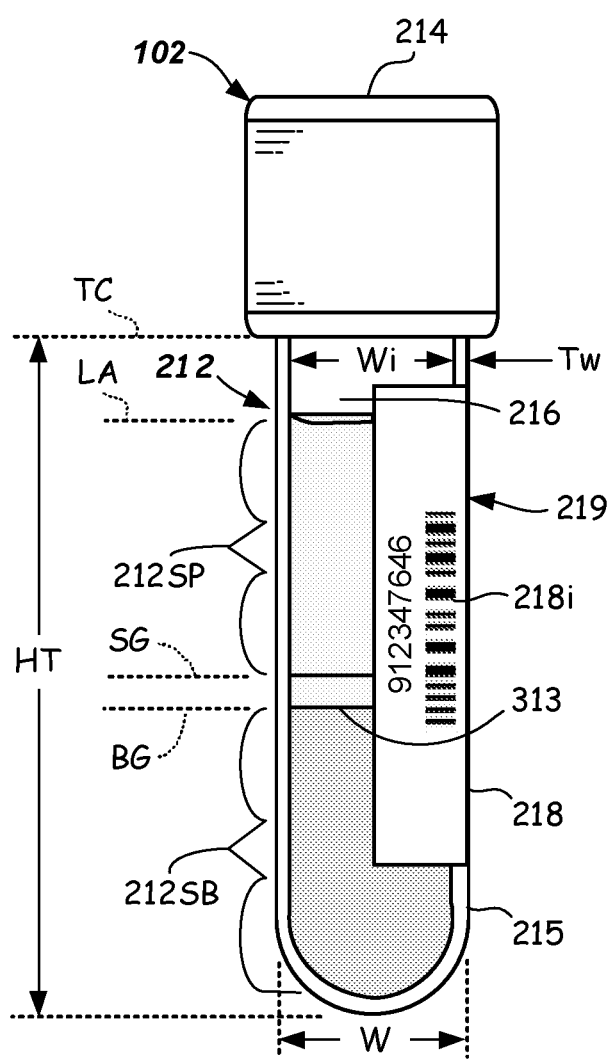
FIG. 3A illustrates a side view of a labeled specimen container including the specimen components of serum or plasma portion, settled blood portion, and gel separator, each of which may be quantified by a specimen quantification method according to one or more embodiments.
Figure 3B:
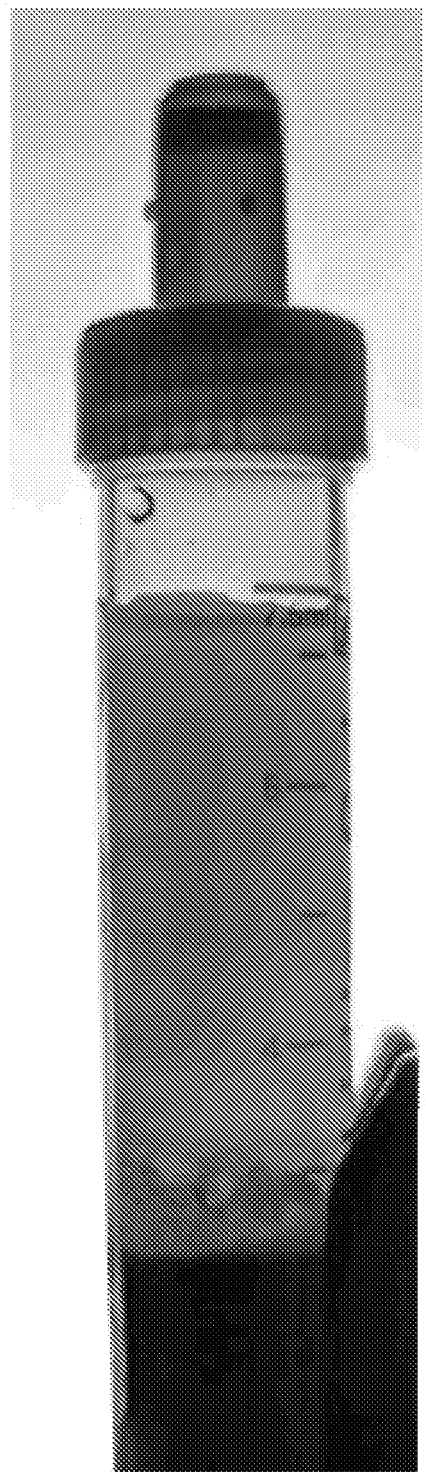
FIG. 3B illustrates a side view photograph of an actual specimen container including a serum or plasma portion, a settled blood portion, and a gel separator, each of which may be imaged and volume quantified by a specimen volume quantification method according to one or more embodiments.

FIG. 1 shows a specimen testing apparatus 100 capable of automatically processing multiple ones of the specimen containers 102 (e.g., specimen collection tubes—see FIGS. 2 and 3A). The specimen containers 102 may be contained in one or more racks 104 provided at a loading area 105 prior to transportation to, and analysis by, one or more analyzers (e.g., first, second, and third analyzer 106, 108, 110, respectively, arranged about the specimen testing apparatus 100). It should be apparent that more or less numbers of analyzers can be used. The analyzers 106, 108, 110 may be any combination of clinical chemistry analyzers and/or assaying instruments, or the like. The specimen containers 102 may each be a generally transparent or translucent container, such as a blood collection tube, test tube, sample cup, cuvette, or other generally clear glass or plastic container. Other suitable containers may be used. The most common configuration is a blood collection tube.

Typically, specimens 212 (FIGS. 2 and 3A) to be automatically processed may be provided to the specimen testing apparatus 100 in the specimen containers 102, which may be capped with a cap 214 (FIGS. 2 and 3A). The caps 214 may have different shapes and/or colors (e.g., red, royal blue, light blue, green, grey, tan, yellow, or combinations, for example), which may have meaning in terms of what test the specimen container 102 is used for, the type of additive in the specimen container 102, or the like. Other colors may be used.

Each of the specimen containers 102 may be provided with identification information 218$i$ (i.e., indicia), such as a barcode, alphabetic, numeric, alphanumeric, or combinations thereof that may be machine readable at various locations about the specimen testing apparatus 100. The identification information 218$i$ may indicate, or may otherwise be correlated, via a Laboratory Information System (LIS) 147, to a patient's identification as well as tests to be accomplished upon the specimen 212, or other information, for example. Such identification information 218$i$ may be generally provided on a label 218 adhered to or otherwise provided on the side of the specimen container 102. The label 218 generally does not extend all the way around the specimen container 102, or all along a length of the specimen container 102. However, in some embodiments multiple labels 218 may be adhered, and may slightly overlap one another. Accordingly, although the label 218 may occlude viewing some portions of the specimen 212, some other portions of the specimen 212 may still be viewable from certain viewpoints.

The specimen 212 may include a serum or plasma portion 212SP and a settled blood portion 212SB contained within the tube 215. Air 216 may be provided above the serum and plasma portion 212SP and the line or demarcation between them is defined herein as the liquid-air interface (LA). The line of demarcation between the serum or plasma portion 212SP and the settled blood portion 212SB is defined herein as the serum-blood interface (SB) as is shown in FIG. 2. The interface between the air 212A and the cap 214 is referred to herein as the tube-cap interface (TC).

In cases where a gel separator 313 is used, the serum gel interface SG between the serum or plasma portion 212SP and the gel separator 313 is shown in FIG. 3A. The blood gel interface BG between the settled blood portion 212SB and the gel separator 313 is also shown in FIG. 3A. In each case, the wall thickness is Tw, the outer width is W and the inner width of the specimen container 102 is Wi. The height of the tube (HT) is defined as the height from the bottom-most part of the tube 215 to the bottom of the cap 214.

In more detail, specimen testing apparatus 100 may include a base 120 (e.g., a frame or other structure) upon which a track 121 may be mounted or supported. The track 121 may be a railed track (e.g., a mono rail track or a multiple rail track), a collection of conveyor belts, conveyor chains, moveable platforms, or any other suitable type of conveyance mechanism. Track 121 may be circular, serpentine, or any other suitable shape. Track 121 may be a closed track (e.g., endless track) in some embodiments. Track 121 may, in operation, transport individual ones of the specimen containers 102 to locations spaced about the track 121 while residing in carriers 122.

Carriers 122 may be passive, non-motored pucks that may be configured to carry a single specimen container 102 on the track 121, or optionally an automated carrier including an onboard drive motor, such as a linear motor that is programmed to move about the track 121 and stop at pre-programmed locations around the track 121. Carriers 122 may each include a holder 122H (FIGS. 4A-4B) configured to hold the specimen container 102 in a defined upright position. The holder 122H may include any suitable construction, and may include a plurality of fingers or leaf springs that secure the specimen container 102 in the carrier 122, but that includes lateral movability or flexibility to allow for accommodation of different sizes (e.g., diameters) of specimen container 102 to be received therein. In some embodiments, carriers 122 may exit from the loading area 105 having one or more racks 104 staged thereat. In some embodiments, loading area 105 may serve a dual function of allowing offloading of the specimen containers 102 from the carriers 122 after the pre-screening and/or analysis is completed. Otherwise, an offloading lane may be provided elsewhere on the track 121.

A robot 124 may be provided at the loading area 105 and may be configured to grasp the specimen containers 102 located at the one or more racks 104 and load the specimen containers 102 onto the carriers 122, such as on an input lane of the track 121 or elsewhere on the track 121. Robot 124 may also be configured to remove specimen containers 102 from the carriers 122 upon completion of the pre-screening or analysis. The robot 124 including one or more (e.g., least two) robot arms or components capable of X and Z, Y and Z, X, Y, and Z, r and theta, or r, theta, and Z motion. Robot 124 may be a gantry robot, an articulated robot, an R-theta robot, or other suitable robot wherein the robot 124 may be equipped with robotic gripper fingers sized to pick up and place the specimen containers 102.

Upon being loaded onto track 121, the specimen containers 102 carried by carriers 122 may progress to a centrifuge 125 (e.g., an automated centrifuge) that may be configured to carry out fractionation of the specimen 212. Carriers 122 carrying specimen containers 102 may be diverted to the centrifuge 125 by an inflow lane or other suitable robot. After being centrifuged, the specimen containers 102 may exit on outflow lane, or otherwise be removed by a robot, and continue on the track 121. In the depicted embodiment, the specimen container 102 in carrier 122 may next be transported to a quality check module 130 to be further described herein with reference to FIGS. 4A-4B.

The quality check module 130 is configured and adapted to determine and provide a direct volume quantification of the specimen 212 contained in the specimen container 102. The quality check module 130 may also be configured for determining a presence of an interferent, such as one or more of hemolysis (H), icterus (I), and/or lipemia (L) contained in a specimen 212. Once the specimen is volume quantified, and it is determined that a sufficient amount of the serum or plasma portion 212SP is present for the tests ordered, the specimen 212 may be pre-screened for presence of an interferent, and if found to be normal (N) or to have a sufficiently low index of HIL, then the specimen 212 may be forwarded to be analyzed in the one or more analyzers (e.g., analyzers 106, 108, and/or 110) before returning each specimen container 102 to the loading area 105 for offloading.

In some embodiments, a remote station 132 may be provided on the automated specimen testing apparatus 100. The remote station 132 is not directly linked to the track 121. For instance, an independent robot 133 (shown dotted) may carry specimen containers 102 containing specimens 212 to the remote station 132 and return them after testing/processing. Optionally, the specimen containers 102 may be manually removed and returned. Remote station 132 may be used to test for certain constituents, such as a hemolysis level, or may be used for further processing, such as to lower a lipemia level through one or more additions, or the like. Other testing or processing may be accomplished at remote station 132. Further, additional stations (not shown) may be arranged around the track 121, such as a de-capping station, aliquot preparation, or the like.

The specimen testing apparatus 100 may include a number of sensors 116 at one or more locations around the track 121. Sensors 116 may be used to detect a location of specimen containers 102 along the track 121 by means of reading the identification information 218i (FIG. 2) placed on the specimen container 102, for example. Other means for tracking the location may be used. All of the sensors 116 may interface with the computer 143 so that the location of each specimen container 102 may be appropriately known at all times.

Centrifuge 125 and each of the analyzers 106, 108, 110 may be generally equipped with robotic mechanisms and/or inflow lanes configured to remove carriers 122 from the track 121, and robotic mechanisms and/or outflow lanes configured to reenter carriers 122 to the track 121.

Specimen testing apparatus 100 may be controlled by the computer 143, which may be a microprocessor-based central processing unit CPU, having a suitable memory and suitable conditioning electronics, drivers, and software for operating the various system components. The computer 143 used for image processing to carry out for the volume characterization methods described herein may include a CPU, GPU or combinations thereof having sufficient processing capability, suitable RAM, and suitable storage. In one example, the computer 143 may be a multi-processor-equipped personal computer (PC) with one or more GPUs, 8 GB Ram or more, and a Terabyte or more of storage. In another example, the computer 143 may be a GPU-equipped PC, or optionally a CPU-equipped PC, operated in a parallelized mode and including 8 GB RAM or more, and suitable storage. In some embodiments, multiple computers may be used, one relatively stronger one for the training of the CNN and one for carrying out testing and the volume characterization methods as described herein. Suitable processors may include INTEL® XEON® Processor, INTEL® CORE™ processor family and INTEL® ATOM™ processor family or even low-energy TEGRA® system on chip (S-OC) including ARM® CORTEX® A9 r4 CPU available from NVIDIA®. Other suitable processors may be used. Operating systems based on Windows, Linux, and OS X may be used.

Computer 143 may be housed as part of, or separate from, the base 120 of the specimen testing apparatus 100. The computer 143 may operate to control, via programmed instructions, movement of the carriers 122 to and from the loading area 105, motion about the track 121, motion to and from the centrifuge 125. Computer 143 or a separate computer may control operation of the centrifuge 125, motion to and from the quality check module 130 as well as operation of the quality check module 130, and motion to and from each analyzer 106, 108, 110 as well as operation of each analyzer 106, 108, 110 for carrying out the various types of testing (e.g., assay or clinical chemistry).

For all but the quality check module 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used. The control of the quality check module 130 to derive direct volume quantification may be provided by the computer 143 according to a neural network-based method, as will be described in detail herein.

Embodiments of the present disclosure may be implemented using a computer interface module (CIM) 145 that allows for a user to easily and quickly access a variety of control screens and status display screens. These control and status screens may describe some or all aspects of a plurality of interrelated automated devices used for pre-screening, preparation, and analysis of specimens 212. The CIM 145 may be employed to provide information about the operational status of a plurality of interrelated automated devices as well as information describing the location of any specimen 212 as well as a status of pre-screening and tests to be performed on, or being performed on, the specimen 212. The CIM 145 is thus adapted to facilitate interactions between an operator and the specimen testing apparatus 100. The CIM 145 may include a display screen adapted to display a menu including icons, scroll bars, boxes, and buttons through which the operator may interface with the specimen testing apparatus 100.

Pre-screening the specimen 212, in accordance with an aspect of the disclosure, may allow accurate and direct volume quantification of the relative amounts of the serum or plasma portion 212SP and the settled blood portion 212SB, but may also provide the volume of the gel separator 313. Such volume quantification ensures that the specimen 212 can be stopped from progressing on to the one or more analyzers 106, 108, 110, if there is insufficient amount of serum or plasma portion 212SP available to carry out all the ordered tests. If the volume is short, an additional draw may be ordered. Moreover, rapid and accurate determination of a ratio of serum or plasma portion 212SP to settled blood portion 212SB may be quickly determined.

Figure 4A:
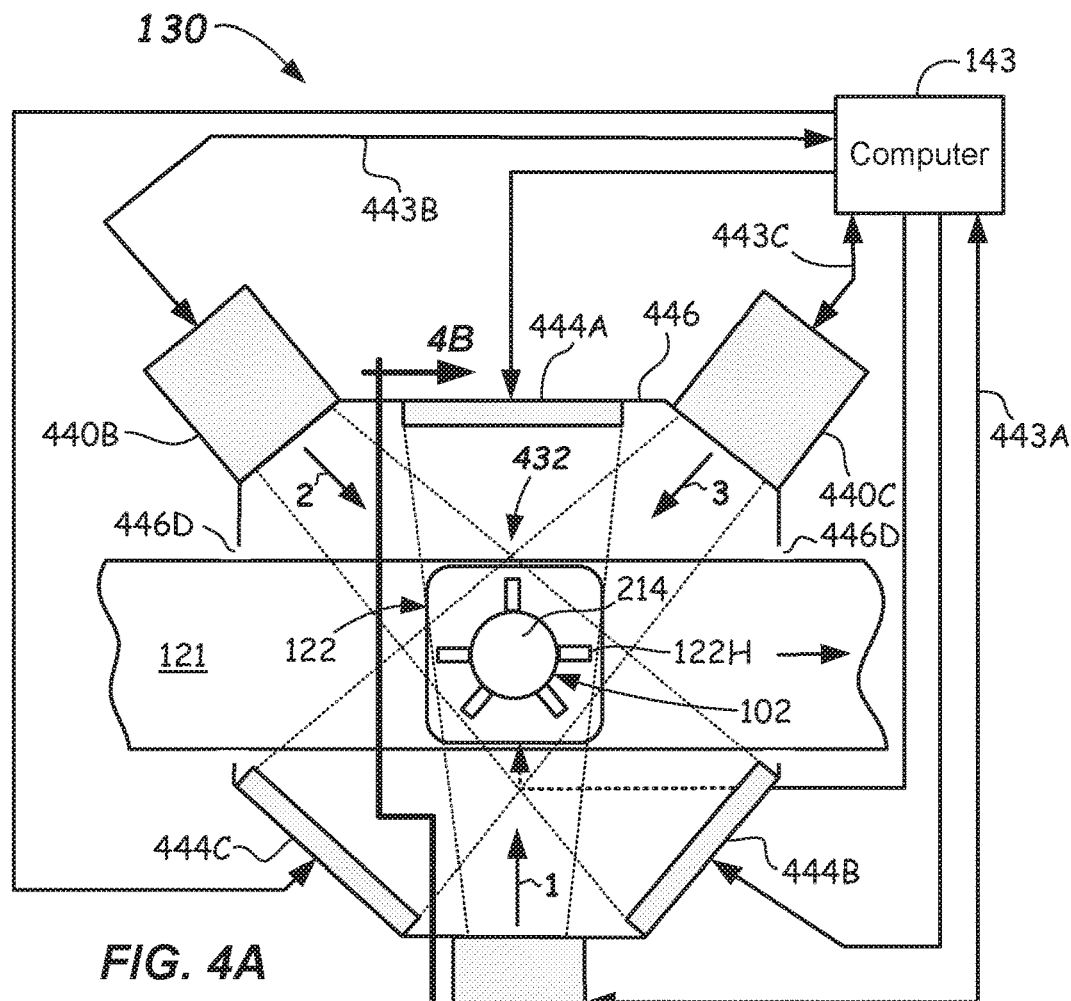
FIG. 4A illustrates a schematic top view of a quality check module configured to capture and analyze multiple images in order to quantify volume of a specimen according to one or more embodiments.
Figure 4B:
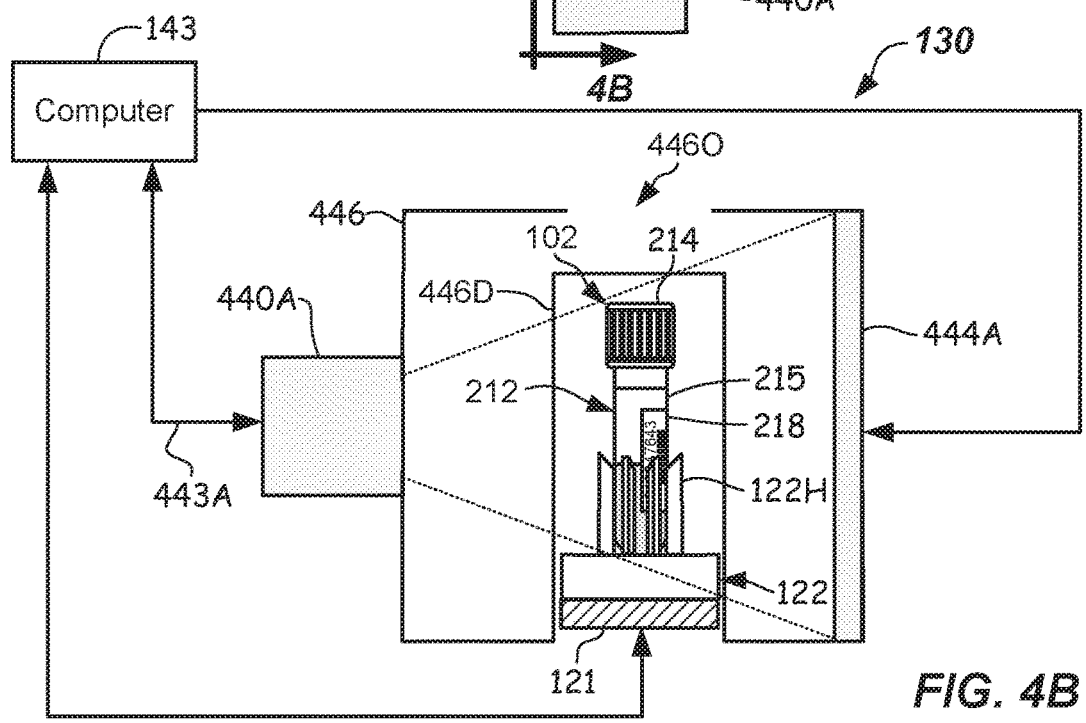
FIG. 4B illustrates a schematic side view of the quality check module of FIG. 4A taken along section line 4B-4B according to one or more embodiments.

With reference to FIGS. 4A-4B, a first embodiment of a quality check module 130 is shown and described. Quality check module 130 may be configured and adapted to automatically quantify a volume of one or more components of the specimen (e.g., quantity the volume of the serum or plasma portion 212SP, the settled blood portion 212SB, the volume of the gel separator 313, any two, or all three of the afore-mentioned) prior to analysis by the one or more analyzers 106, 108, 110. Volume pre-screening in this manner allows determination that a sufficient amount (e.g., volume) of the liquid portion (e.g., serum or plasma portion 212SP of the specimen 212) is available, thus avoiding wasting valuable analyzer resources.

In addition to the specimen quantification method wherein volume of the serum or plasma portion 212SP and a volume of the settled blood portion 212SB is quantified, other detection methods may take place on the specimen 212 contained in the specimen container 102 at the quality check module 130.

Now referring to FIGS. 1, 4A and 4B, a first embodiment of a quality check module 130 configured to determine specimen volume and including multiple image capture devices 440A-440O is shown. Three image capture devices 440A-440C are shown, but one, two or more, or even four or more image capture devices can be used. Image capture devices 440A-440O may be conventional digital cameras capable of capturing a digital image (i.e., a pixelated image), charged coupled devices (CCD), an array of photodetectors, one or more CMOS sensors, or the like. For example, three image capture devices 440A, 440B, 440C are illustrated in FIG. 4A and are configured to capture digital images from three different lateral viewpoints.

Each image capture device 440A, 440B, 440C may be a device capable of capturing a digital pixelated image having any suitable image size. By way of example, the image size may be about 2560 pixels in height×694 pixels in width in one embodiment, and about 1280 pixels in height×384 pixels in width in another embodiment. Other pixel densities and ratios of height to width may be used.

Figure 7A:
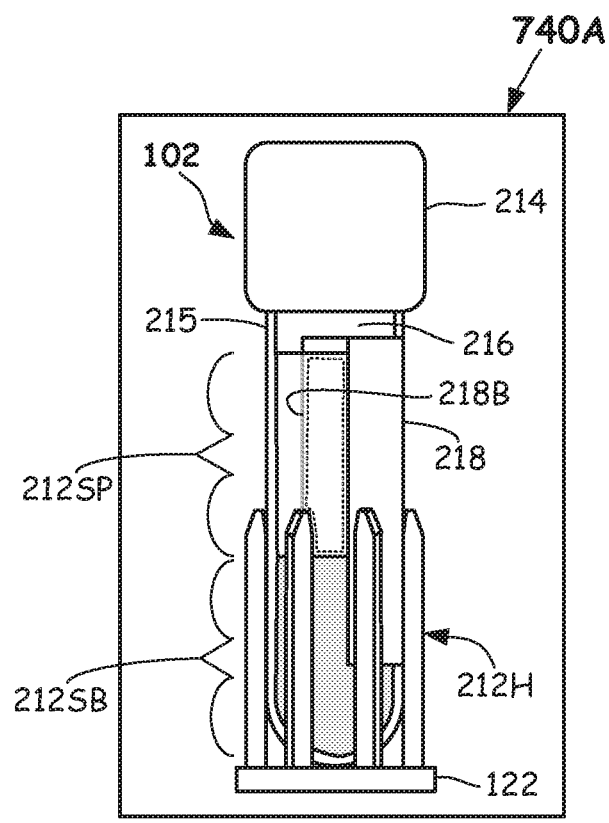
FIG. 7A illustrates a side view image of the specimen container including specimen from viewpoint 1 and illustrating a first extent of occlusion by the label according to one or more embodiments.
Figure 7B:
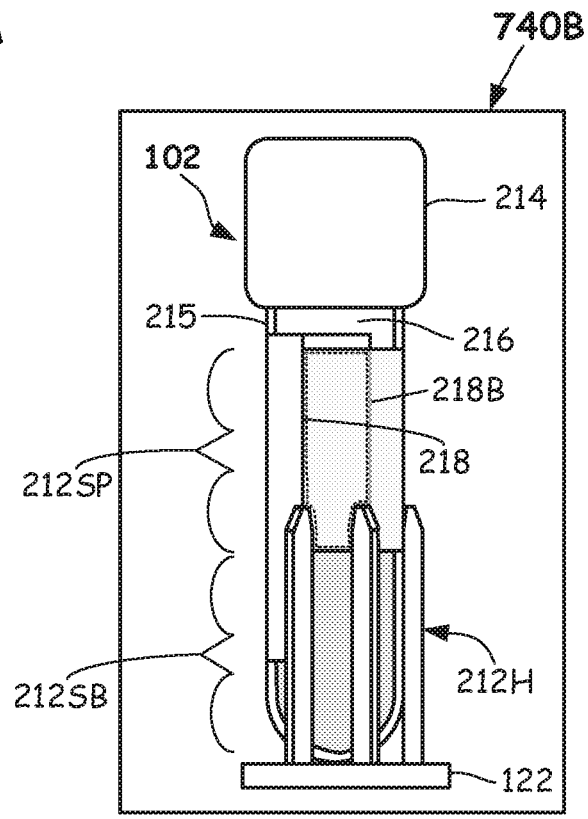
FIG. 7B illustrates a side view image of the specimen container including specimen from viewpoint 2 and illustrating a second extent of occlusion by the label according to one or more embodiments.
Figure 7C:
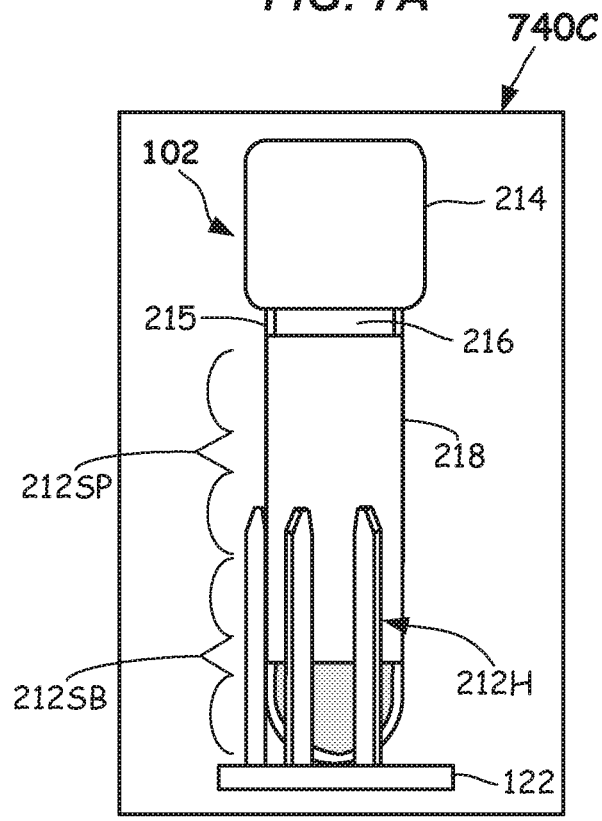
FIG. 7C illustrates a side view image of the specimen container including specimen from viewpoint 3 and illustrating a third extent of occlusion by the label according to one or more embodiments.
Figure 7D:
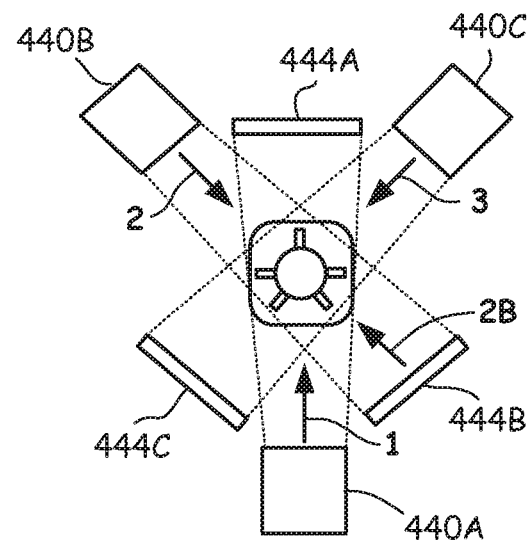
FIG. 7D illustrates a top view image of a quality check module illustrating the various viewpoints 1-3 according to one or more embodiments.

Example images 740A-740O of a specimen container 102 containing specimen components such as serum or plasma portion 212SP and settled blood portion 212SB, from multiple viewpoints are shown in FIGS. 7A-7C. Each image capture device 440A-440C may be configured and operable to capture lateral images of at least a portion of the specimen container 102 and at least a portion of the specimen 212. For example, the image capture devices 440A-440C may capture all or part of the cap 214, all or part of the tube 215, and all or part of the specimen 212. Eventually, from the multiple images, a volume of the respective bio-fluid components of the specimen 212 can be determined. In some embodiments, a composite model may be generated and used to make final determinations or to confirm determinations made by the individual image capture devices 440A-440C about the volume quantification of the specimen 212. For example, the volume results of the various viewpoints may be averaged in some embodiments. Outliers may be ignored.

In the embodiment shown in FIGS. 4A and 4B, the viewpoints may be spaced so that they are approximately equally spaced from one another, such as about 120 degrees from one another, as shown, when three image capture devices 440A, 440B, 440C are used. As depicted, the image capture devices 440A-4400 may be arranged around the track 121. Other arrangements and spacing of the plurality of image capture devices 440A-4400 may be used. In this way, the images of the specimen 212 may be taken, while the specimen container 102 is residing in the carrier 122, and without having to rotate the specimen container 102 to find a suitable view window for imaging. With three viewpoints, at least one of the viewpoints should provide an unimpeded view of the specimen 212. In some embodiments, the images that are captured may overlap each other slightly at the edges.

In one or more embodiments, the carriers 122 may be stopped at a pre-determined location in the quality check module 130, such as at a point where normal vectors from each of the image capture devices 440A-440C intersect. This location is referred to herein as the imaging location 432. In some embodiments, a gate may be provided to stop the carriers 122 at the imaging location 432, so that good quality images may be captured. In other embodiments, the carriers 122 may include a linear motor configured to stop at desired locations, such as at the imaging location 432, as programmed. In an embodiment where there is a gate at the quality check module 130, one or more sensors (like sensors 116) may be used to determine the presence of a carrier 122 at the quality check module 130.

The image capture devices 440A-4400 may be provided in close proximity to and trained or focused to capture an image window, i.e., an area including the imaging location 432, wherein the specimen container 102 may be stopped so that the specimen container 102 is approximately located in a center of the image window. As configured, the image capture devices 440A-4400 can capture images that include all of the serum or plasma portion 212SP, all of the settled blood portion 212SB, all of the gel separator 313 (if present), and some or all of the cap 214, and possibly the bottom-most portion of the tube 215.

In operation, each image may be triggered and captured responsive to a triggering signal provided in communication lines 443A-443C that may be sent by the computer 143 based on a pre-configured image capture protocol or sequence. Each of the captured images may be processed by the computer 143 according to one or more embodiments of the quantification methods provided herein. In particular, high dynamic range (HDR) processing may be used to capture and process the images and associated image data in order to volume quantify the specimen 212.

In more detail, multiple images may be sequentially captured of the specimen 212 (e.g., the specimen 212 separated by fractionation) at the quality check module 130 at multiple different exposures (e.g., exposure times), while being illuminated by different light sources emitting different light spectra having different nominal wavelengths, and from different viewpoints. For example, each image capture device 440A-440C may take 4-8 or more images at different exposures times at one or more spectra (e.g., red (R), green (G), and blue (B) light). The images at the different exposures for each spectrum may be back-lighted and taken sequentially for all image capture devices 440A-4400. Images may be captured in a round robin fashion for each viewpoint, for example. Other numbers of images may be captured at any suitable exposure increment.

In one embodiment, the multiple wavelength images may be accomplished by illuminating the specimen 212 using different colored light sources 444A-444C. The light sources 444A-444C may be back-lighting sources, and may back light the specimen container 102 (as shown in FIGS. 4A-4B) in a first embodiment. In particular, back-lighting is provided when the respective light source 444A-444C is arranged behind the imaging location 432 from the view perspective of the associated image capture device 440A-4400. Optionally, light sources may front light the specimen container 102, such as by being arranged above, below, or to the side of the respective image capture device 440A-4400. A light diffuser and/or light filter may be used in conjunction with the light sources 444A-444C in some embodiments. Suitable backlighting sources are described in US Provisional Application 62/288,381 entitled "METHODS AND APPARATUS FOR CHARACTERIZING A SPECIMEN CONTAINER AND SPECIMEN" filed on Jan. 28, 2016.

For example, to capture images with the first spectra, three red light sources (nominal wavelength of about 450 nm with spectral range of about +/−35 nm) may be used to sequentially illuminate the specimen 212 from three laterally-spaced locations. The red illumination by the individual light sources 444A-444C may occur as the multiple images (e.g., 4-8 or more images) at different exposure times are sequentially captured by each image capture device 440A-4400. In some embodiments, the exposure times may be between about 1 ms and 256 ms, for example. For example, four exposure times of 8 ms, 32 ms, 128 ms, and 156 ms may be used. Other numbers and lengths of exposure times may be used. Other suitable optical means for varying image exposure may be used.

In each embodiment, the quality check module 130 may include a housing 446 that may at least partially surround or cover the track 121, and the specimen container 102 may be located inside the housing 446 during image taking so that external lighting (e.g., ambient or room light) is minimized. Housing 446 may include one or more doors 446D to allow the carriers 122 to enter into and/or exit from the housing 446. In some embodiments, the ceiling may include an opening 4460 to allow a specimen container 102 to be loaded into the carrier 122 by a robot including robot gripper fingers from above. In some embodiments, the inside wall surfaces of the housing 446 may be black-colored.

Once the red illuminated images are captured, the red light sources 444A-444C may be turned off and another spectra of light, for example, green light sources 444A-444C may be sequentially turned on (nominal wavelength of about 560 nm with spectral range of about +/−35 nm), and multiple images (e.g., 4-8 or more images) at different exposure times may be captured at that wavelength by each image capture device 440A-440C arranged at the different lateral viewpoints. This may be repeated with blue light sources 444A-444C (nominal wavelength of about 635 nm with spectral range of about +/−35 nm) for each image capture device 440A-440C. More or less wavelengths or different colors other than RGB may be used. The light sources 444A-444C having different wavelengths may be accomplished by any suitable means, such as via use of exchangeable filters, for example, or banks of different colored light sources that can be selectively turned on and off, for example. Other means for generating different spectra (colored) lighting may be used.

In each of the above, the multiple images taken at multiple exposure times for each respective wavelength (e.g., R, G, and B) may be obtained in rapid succession, such that the entire collection of images for the specimen 212 from multiple viewpoints may be obtained in less than about 2s, for example. By way of example, and not by limitation, four different exposure images for each wavelength at three viewpoints using three image capture devices 440A, 440B, 440C and backlighting with light sources 444A-444C that include banks of RGB sources will result in 4 images×3 colors×3 cameras=36 images, taken is rapid succession. The image data may be stored in memory of the computer 143 and subsequently processed thereby to volume quantify the specimen 212 as is described herein.

Figure 5A:
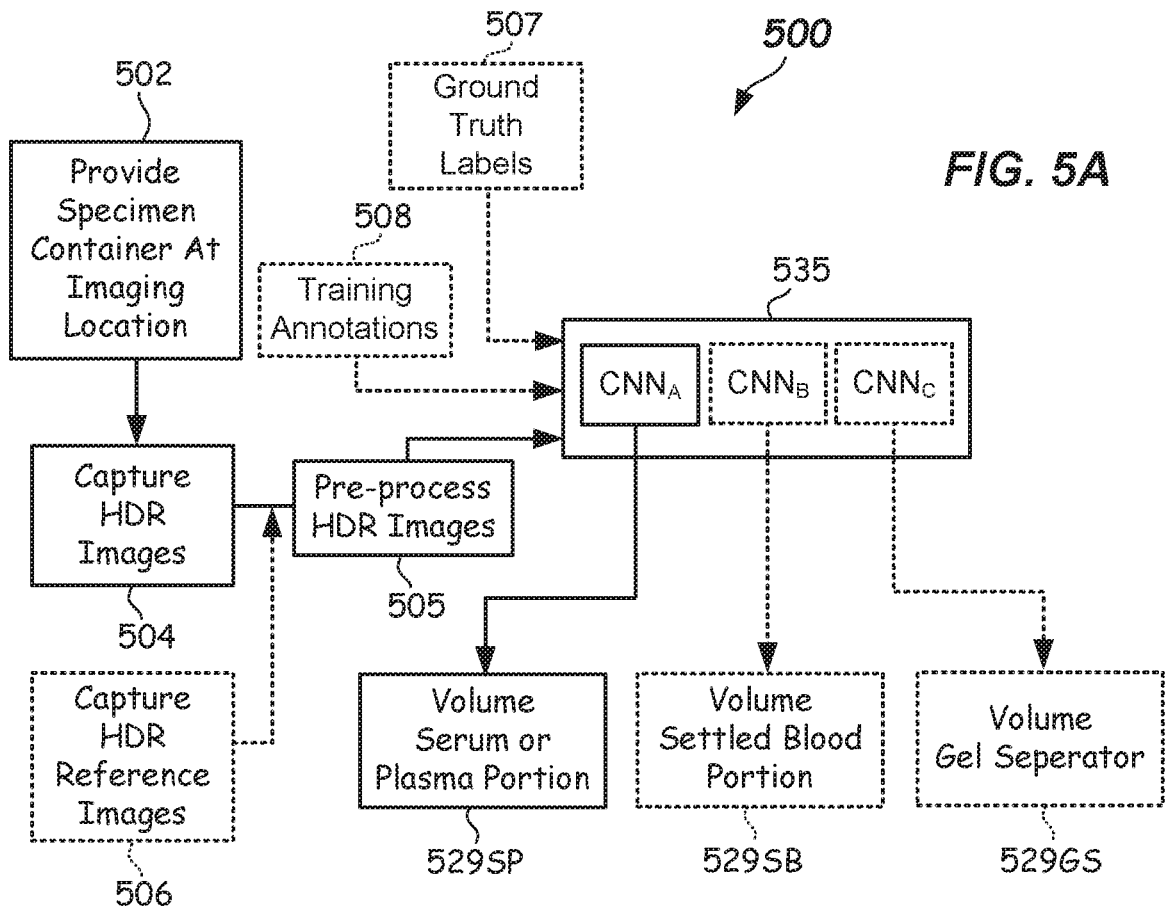
FIG. 5A illustrates a block diagram of functional components of a quality check module configured to quantify volume of one or more components of a specimen according to one or more embodiments.
Figure 5D:
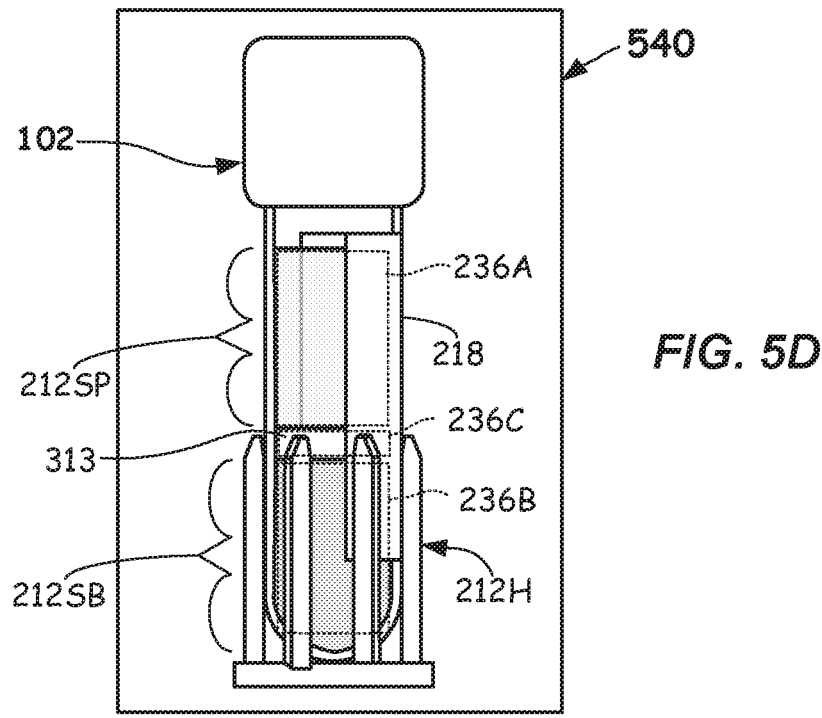
FIG. 5D illustrates a lateral image from a viewpoint and bounding boxes for respective serum or plasma portion, settled blood portion, and gel separator according to one or more embodiments.

Reference will now be made to FIG. 5A, which describes the functional components of the volume quantification apparatus 500. The volume quantification apparatus 500 may involve image capture by providing the specimen container 102 including the specimen 212 at the imaging location 432 in 502. Thereafter, the HDR images are captured in 504 as described above. In order to reduce the amount of data input, the image data of the HDR images may be pre-processed in 505. Pre-processing may involve, for example, selection of optimally-exposed pixels from the multiple captured images at the different exposures for each spectrum and normalization thereof for each image capture device 440A-440O, so as to generate optimally-exposed image data for each spectrum (e.g., R, G, and B) and for each image capture device 440A-440C. This pre-processing phase provides image consolidation so that fewer images need to be processed.

Consolidation includes, for each corresponding pixel of the exposure time images from each image capture device 440A-440C, selecting pixels exhibiting optimal image intensity from each of the different exposure time images. Optimal image intensity may be defined as pixels that fall within a predetermined intensity range (e.g., intensity of between 180-254 on a scale of 0-255), for example. However, other suitable ranges could be used. If more than one pixel in the corresponding locations of two images is determined to be optimally exposed, the higher of the two can be selected. The result is a plurality of consolidated color image data sets (e.g., R, G, B) for each image capture device 440A-440O where all of the pixels are optimally exposed (e.g., one image data set per spectrum (e.g., R, G, and B) and image capture device 440A-440O. The optimally-exposed intensity values for each pixel may then be normalized by the exposure time, so that all pixels in each consolidated image are normalized regardless of exposure time.

As part of the calibration of the quality check module 130, optional reference images without a specimen container 102 or carrier 122 may be captured in 506. In this way, background pixels may be readily removed from each image data sets leaving only the foreground image. Such optional background reduction may also be accomplished during the pre-processing of HDR images in 505. Reference images for each exposure time and lighting condition (e.g., R, G, B) may be taken by the quality check module 130 before carrying out the specimen volume quantification method, for example. Other suitable means for background removal may be used.

Figures 5B, 5E:
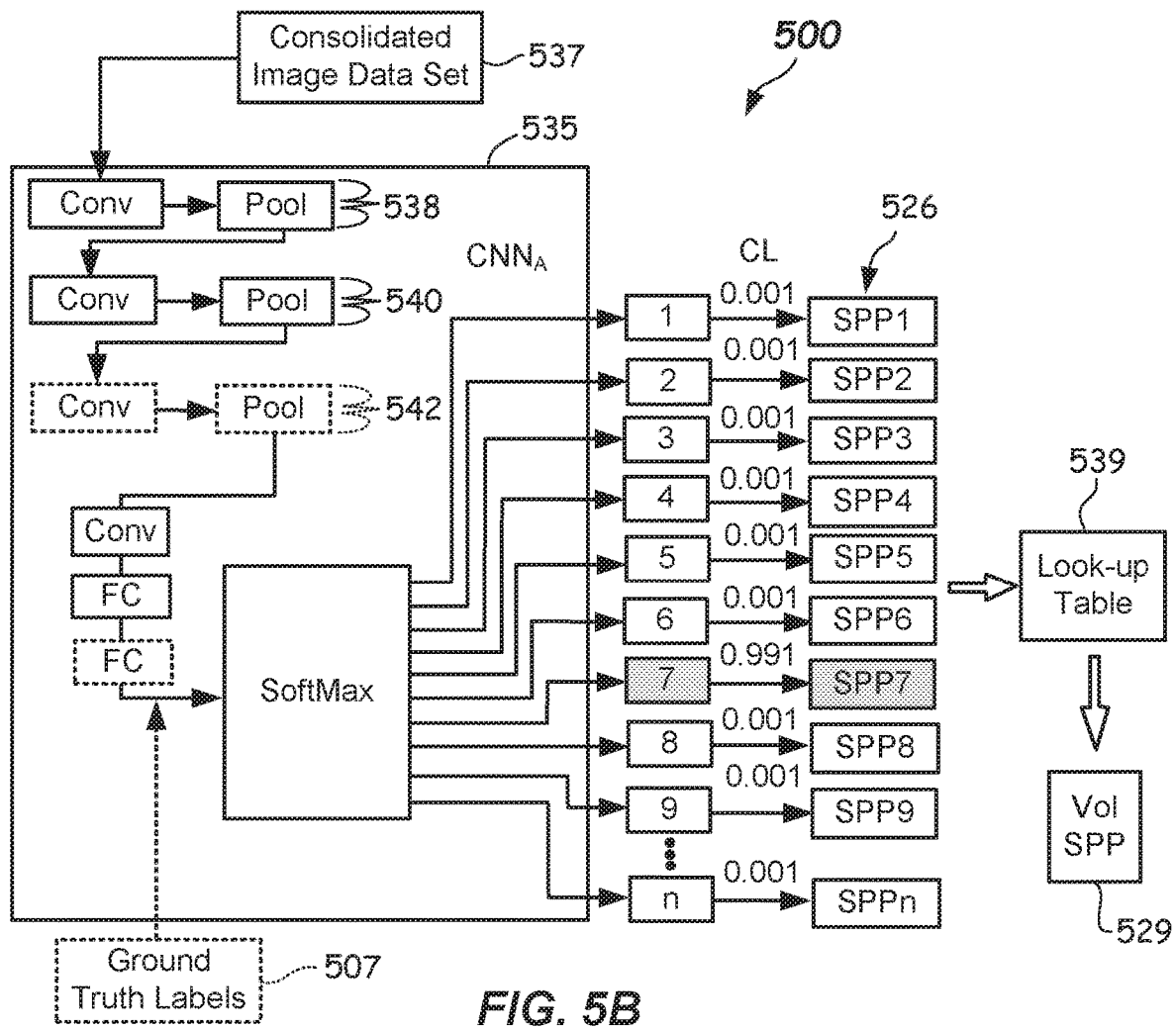
FIG. 5B illustrates a detailed block diagram of components of a quality check module including a neural network configured to quantify volume a serum or plasma portion contained in a specimen according to one or more embodiments.
FIG. 5E illustrates a look-up table according to one or more embodiments.
Figure 5C:
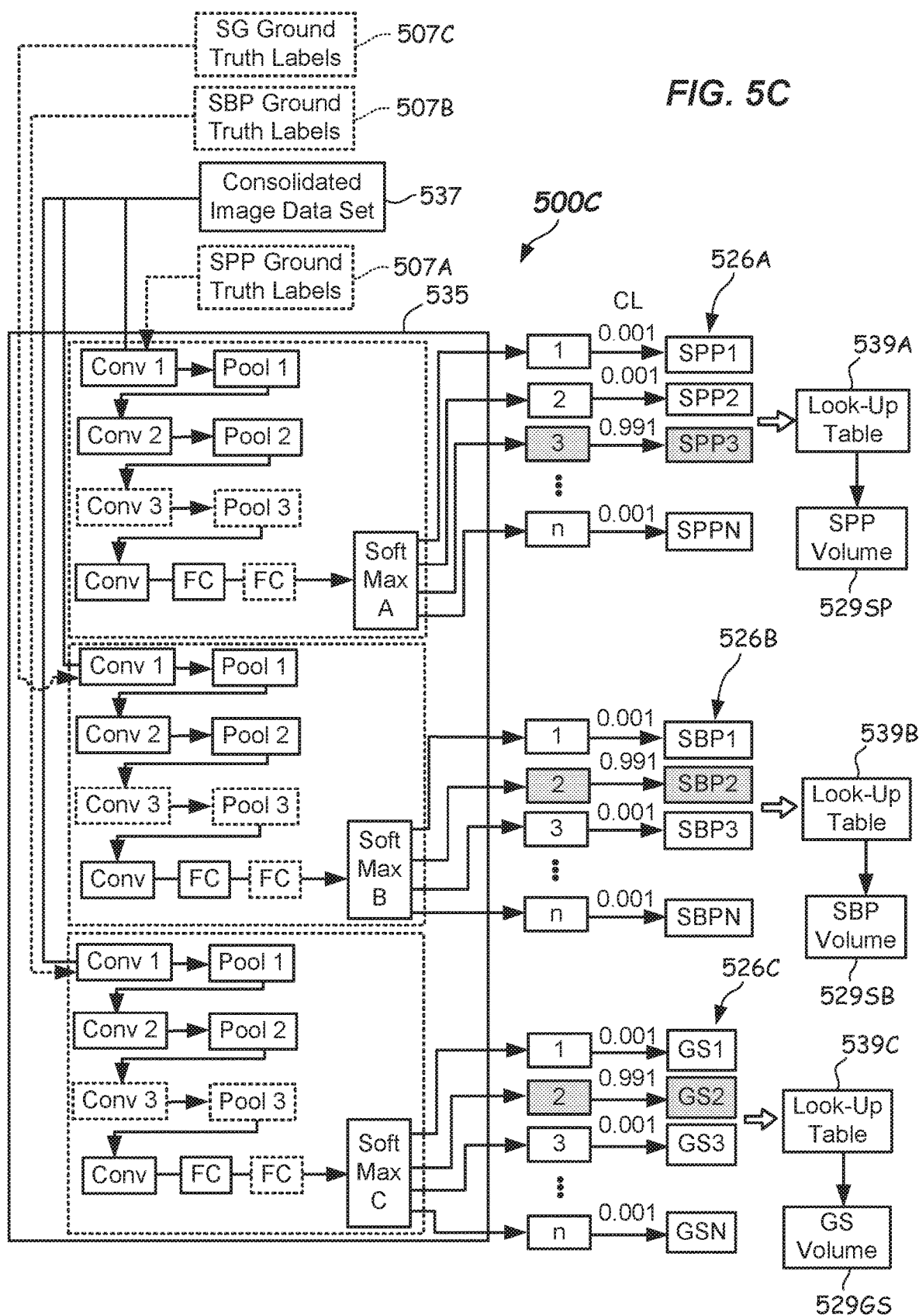
FIG. 5C illustrates a block diagram of components of a quality check module including a neural network configured to quantify volume of all three of serum or plasma portion, settled blood portion, and gel separator contained in a specimen container according to one or more embodiments.

For each consolidated image data set including optimally-exposed pixels, a characterization method is undertaken to output one of: 1) a volume directly, or 2) a volume class, which can be readily converted to a volume value by any suitable means, such as a look-up table, or the like. In particular, the image data sets are provided as a direct input to a volume-determining model comprising a neural network 535. As is shown in FIGS. 5B and 5C, a neural network 535 may be provided that comprises one or more convolutional neural networks, such as $CNN_A$, $CNN_B$, and/or $CNN_C$. The CNN's may each be pre-trained convolutional neural networks (CNNs) that are trained to quantify volume or volume class of the one or more components of the specimen 212.

In particular, in the embodiments of FIGS. 5B and 5C, the output of the CNN 535 is used to derive a volume class of the serum or plasma portion 212SP in 526 (or serum or plasma portion 212SP in 526A, settled blood portion 212SP in 526B, or gel separator 313 in 526C) that can then output a volume value via use of a look-up table, or the like. In other embodiments, the volume may be output directly from the CNN 635 as will be described in FIG. 6B. In any event, the volume quantification is accomplished without any sort of segmentation process wherein the geometrical confines of boundaries of the test specimen 212 that is serum or plasma portion 212SP are first determined on the test specimen 212. Thus, volume quantification may be readily and directly achieved from the input data of the images.

The CNNs described herein may be coded using any suitable scientific computing framework, program, or toolbox, such as, Caffe available from Berkley Vision and Learning Center (BVLC), Theano, a Python framework for fast computation of mathematical expressions involving multi-dimensional arrays, TensorFlow available from Google, Inc., Torch, and the Math Kernel Library (MKL) available from Intel Corporation of Santa Clara, Calif., which is an optimized math library for CPU-based neural network computations, and the like, for example.

Now referring to FIGS. 5A and 5C, the neural network 535 may include one or more convolutional neural networks $CNN_A$, $CNN_B$, $CNN_C$ that may process the image data and output volume of the serum or plasma portion in 529 or 529SP, volume of the settled blood portion in 529SB, and/or output volume of the gel separator 313 in 529GS. For ease of volume determination, individually-trained CNNs may be used for volume quantification of each specific component of the specimen 212.

For each of the CNNs (e.g., $CNN_A$, $CNN_B$, $CNN_C$), multiple sets of training examples are used to train the individual CNNs. The CNNs (e.g., $CNN_A$, $CNN_B$, $CNN_C$) may be trained by providing ground truth labels 507 for each together with training images as training input. The ground truth labels 507 are defined as the possible outcomes from the particular CNN (e.g., either volume directly or volume class). For example, the ground truth labels 507 may be, for example, 10-10,000 different volume or volume class outcomes that the CNN can be configured to map to. Other embodiments may use less training such as between 100 and 1,000 different volume or volume class outcomes, or even between 100 and 500 different volume or volume class outcomes. The graduations between the outcomes may not be linear, and thus the spacing of the trained outcomes may be more concentrated into areas of common volumes. For example, as shown in FIG. 5B, the $CNN_A$ is configured with 1-$n$ ground truth labels of volume classes SPP1-SPPn as outcomes, whereas in FIG. 6A, the ground truth labels would be trained values for SPP VOL 1 through SPP VOLn, which are volume values as outcomes that can be directly output and mapped to by the CNN 635.

In each case, the training of the CNN 535, 635 involves inputting a large amount of training images (e.g., 500-10,000 or more digital image data sets) that include associated training annotations for each. For example, the training annotations 508 for each CNN may include a graphical outline, such as training boundary boxes 236A, 236B, 236C (e.g., rectangles), as shown dotted in FIG. 5D identifying the graphical location of the particular bio-fluid component(s) being trained within the image (e.g., serum or plasma portion 212SP, settled blood portion 212SBP, and gel separator 313). The training annotations 508 may further include a scalar value of the volume that is representative of the volume included within each specific training boundary box 236A, 236B, 236C. Thus, the training annotations 508 may include graphically outlining various regions (e.g., 212SPP, 212SBP, 313) in a multitude of training specimens of known volume together with scalar volume values for each training boundary box 236A, 236B, 236C. The training specimens may have various specimen volumes of serum or plasma portion 212SP, settled blood portions 212SB, and gel separator 313, various degrees of occlusion by label 218, containing gel separator 313 or not, different sizes of specimen containers 102 (e.g., different diameters and heights), and the like.

Once the CNN 535, 635 is appropriately trained such that the CNN determines the correct outcome with a sufficiently-high confidence (e.g., 98% or even >99%), then the quality check module 130 and volume quantification method may be used to determine the volume of one or more components of a specimen 212 as part of a pre-screening testing method that takes place before actual specimen testing on an analyzer (e.g., on analyzers 106, 108, and/or 110). The testing CNN model would be devoid of ground truth input having been trained.

As is shown in FIG. 5B, an embodiment is configured to output a volume class (e.g., SPP1 through SPPn) of the serum or plasma portion 212SP. In more detail, the CNN 535 may include suitable number of operating layers to provide for deep learning. The described CNN architecture may be used for volume classification using a 64×64 patch (64 pixels×64 pixels), for example. However, other patch sizes may be used, such as 31 pixels×31 pixels, for example. For the volume quantification task, three major operating layers of the CNN 535 may be selected, for example. The first operating layer 538 comprising a convolution layer and a pooling layer may extract very local structure edges; the second operating layer 540 also comprising a convolution layer and a pooling layer may learn texture, which is a combination of edges; and in some embodiments, even a third operating layer 542 (which may be optional) may form parts of regions. Each of the layers 538, 540, 542 of the CNN 535 benefit from the multichannel (e.g., multi-spectral, multi-exposure) image data, which has been provided from the HDR image processing. These computations over various input channels, such as when 3 input layers (e.g., RGB spectral components including HDR) are used, can inherently be handled and can be represented by the deep learning network. This framework naturally integrates low, mid, and high level features, and is operational to provide suitable classification into various volume class output options in 526.

The architecture of the CNN 535 may include various combinations of convolution layers (Cony), pooling layers (Pool), and fully-connected layers (FC—otherwise referred to as "inner products"). For example, one embodiment the CNN 535 may include an architecture including convolution layers, pooling layers, a final convolution layer and at least one and optionally two fully-connected layers FC. A loss layer, such as a SoftMax may be included in the CNN 535. For example, the loss layer may be a Soft Max since the solution of the CNN 535 is one classifications selected from the plurality of volume classes (SPP1-n), i.e., where confidences are provided for each channel output (channel outputs are shown as boxes 1-n) and a voting schema may select one output configuration. In some embodiments, an adapted CNN architecture may be used, such as, in order, Conv-Pool-Conv-Pool-Conv-Pool-Conv-FC-FC-SoftMax. Parameters such as filter size and stride can be set as part of the parameter tuning when setting up and training the CNN 535.

Figure 6A:
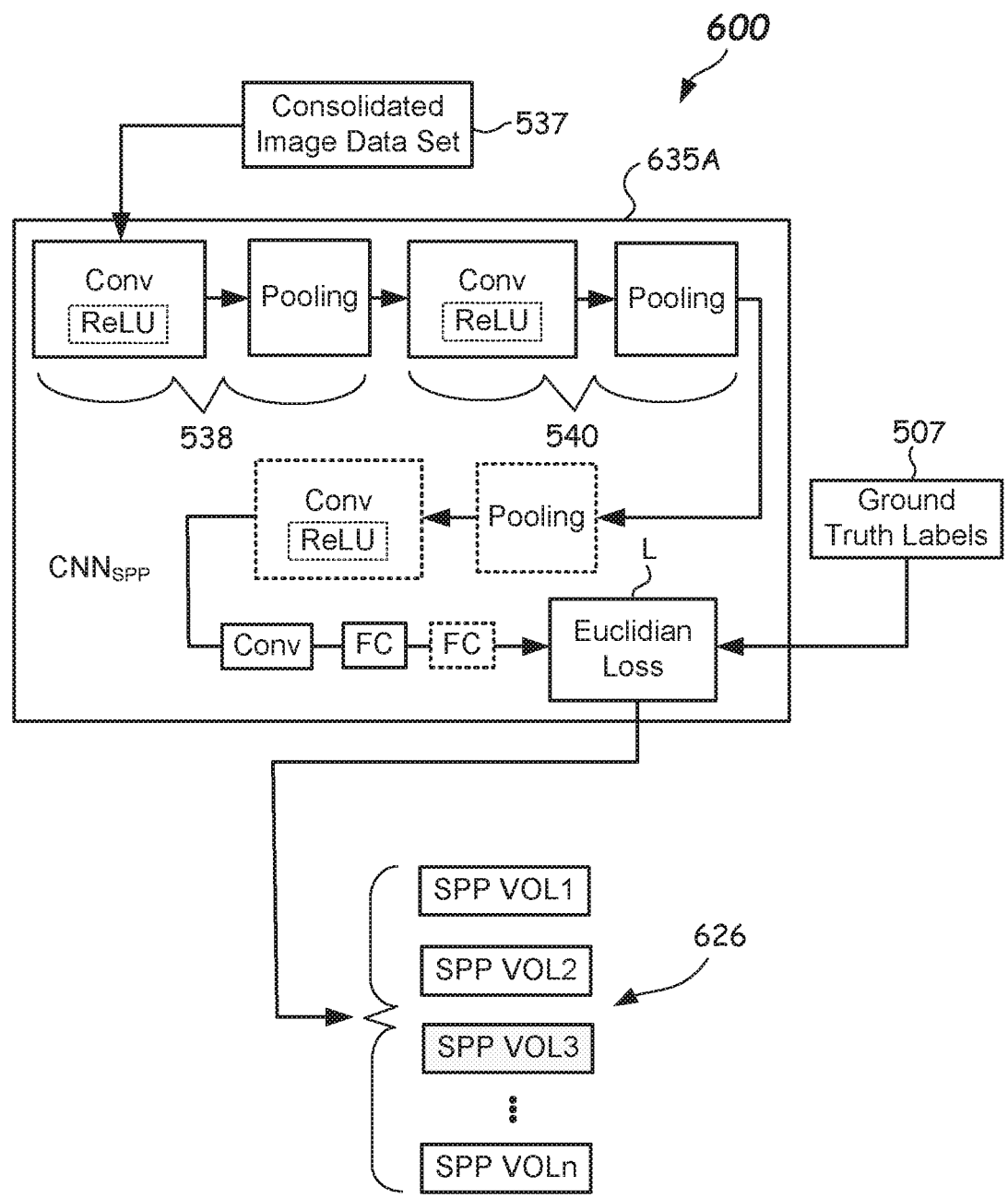
FIG. 6A illustrates a block diagram of components of a quality check module in a training configuration including a neural network configured to quantify volume of a specimen directly according to one or more embodiments.
Figure 6B:
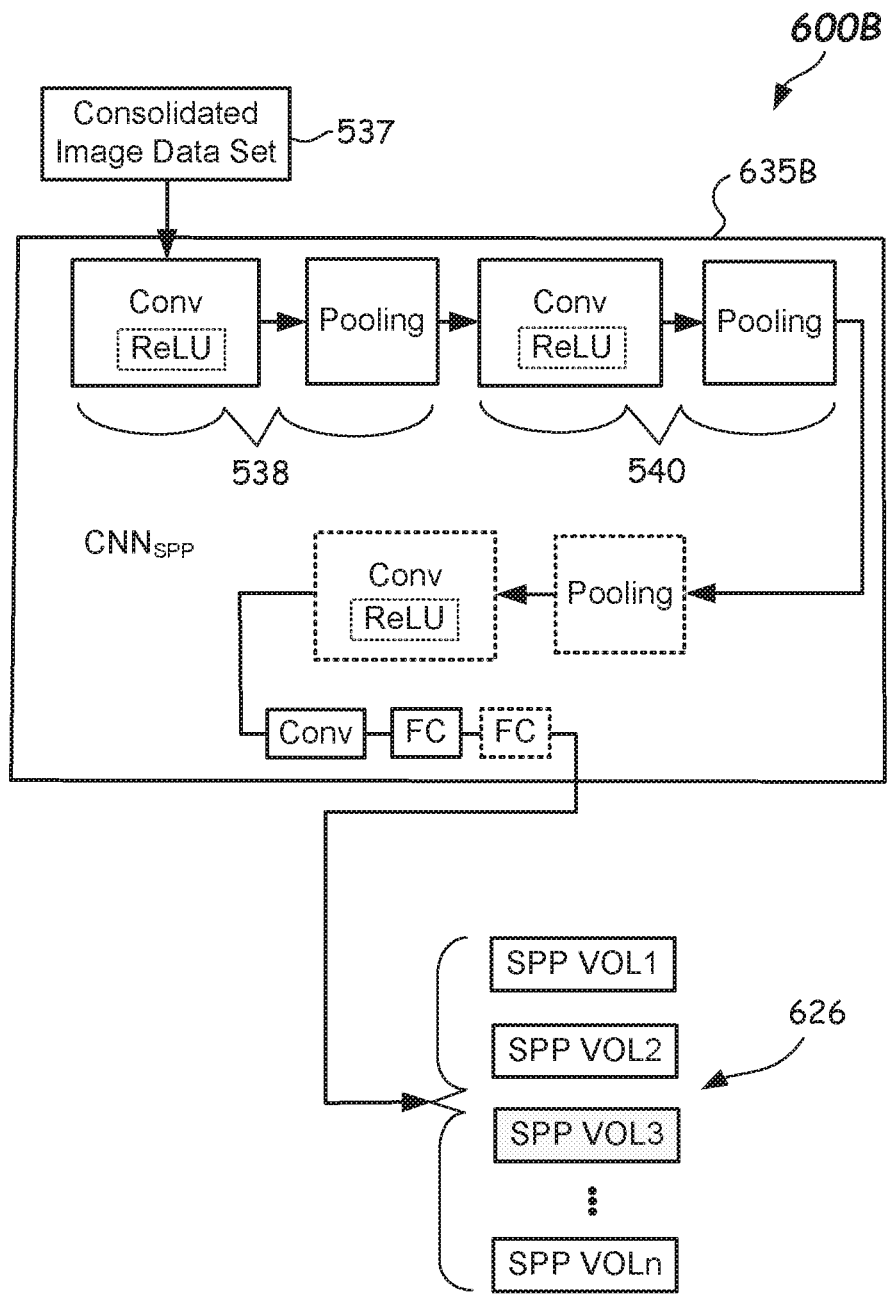
FIG. 6B illustrates a block diagram of components of a quality check module in a testing configuration including a neural network configured to quantify volume of a specimen directly according to one or more embodiments.

FIGS. 6A and 6B illustrates respective training CNN 635A and testing CNN 635B that output volume directly. The architecture may be as previously described. However, in some embodiments, the CNN 635A, 635B may optionally include a ReLU, which is a rectifier and activation function (also known as a ramp function), which enables the network to be extended. The use of the ReLU as a non-linearity has been shown to enable training deep supervised neural networks without unsupervised pre-training. Rectified linear units (ReLU's) allow for faster and effective training of deep neural network architectures on large and complex datasets, like in the case of specimen imaging. In particular, the training CNN 635A includes a loss layer L, such as a Euclidian loss layer. The testing CNN 635B includes a final convolutional layer (Cony) and one or more fully convolutional layers FC that can map directly to a single volume (e.g., to one of SPP VOL 1-SPP VOL n) in 626. The number of the plurality of volumes that may be mapped to as an output may comprise between 10 and 10,000, 100-1,000, or even 100-500, for example. Other numbers may be used.

In both training and testing, a sliding window or patch is used where each region of the specimen 212 is classified with the CNN 535, 635A, 635B, and each patch gives a response towards one or more of the pre-defined output options. Candidates are then classified as one or more of the predefined options (volume class or volume) by a voting scheme or by output to a results vector.

In the first embodiment of FIGS. 5B and 5C, the volume classification for the various regions results in one and only one outcome 526 or 526A-526C for each component of the specimen 212 and a confidence level for each possible outcome, which may be normalized to one, for example. One such result is provided for each viewpoint. The reported configuration for each viewpoint is the volume classification having the highest confidence level (CL). These results may be reported individually or as an average. Further, a warning may be provided to the operator of the LAS and/or to the LIS 147 if the insufficient volume is present for the ordered test. Moreover, the volume results and ratio of the components of serum or plasma portion 212SOP and settled blood portion 212SB may be immediately reported to the LIS 147.

After being appropriately trained, for each specimen 212 being tested, the consolidated data set 537 is input to and operated on by the $CNN_A$ 535, 635B. The ground truth labels 507 have been previously input and established during training. The CNN 535, 635B will converge to one of the volume class outcomes 526 or volumes 626 established by the ground truth labels 507 with a relatively high confidence (e.g., >98%). For example, in the depicted example of FIG. 5B, the voting scheme has selected channel 7. Thus, the $CNN_A$ 535 has converged to volume class outcome SPP7 with the highest confidence (e.g., confidence of 0.991) of all the channel outputs 1-n. A lookup table 539 may then be referenced to extract a corresponding volume value 529 that has been pre-populated in the look-up table 539 (See FIG. 5E) for each volume class outcome 526.

Additional processing of the image data sets from the other viewpoints may also provide volume values and the volume value outputs from all the viewpoints may be averaged to provide an excellent estimate of the volume of the serum or plasma portion of the specimen 212SP and/or other components. Accordingly, it should be apparent that the neural network-based quantification method described herein and carried out by the quality check module 130 may result in a rapid volume quantification of the serum or plasma portion 212SP of the specimen 212.

Figure 8:
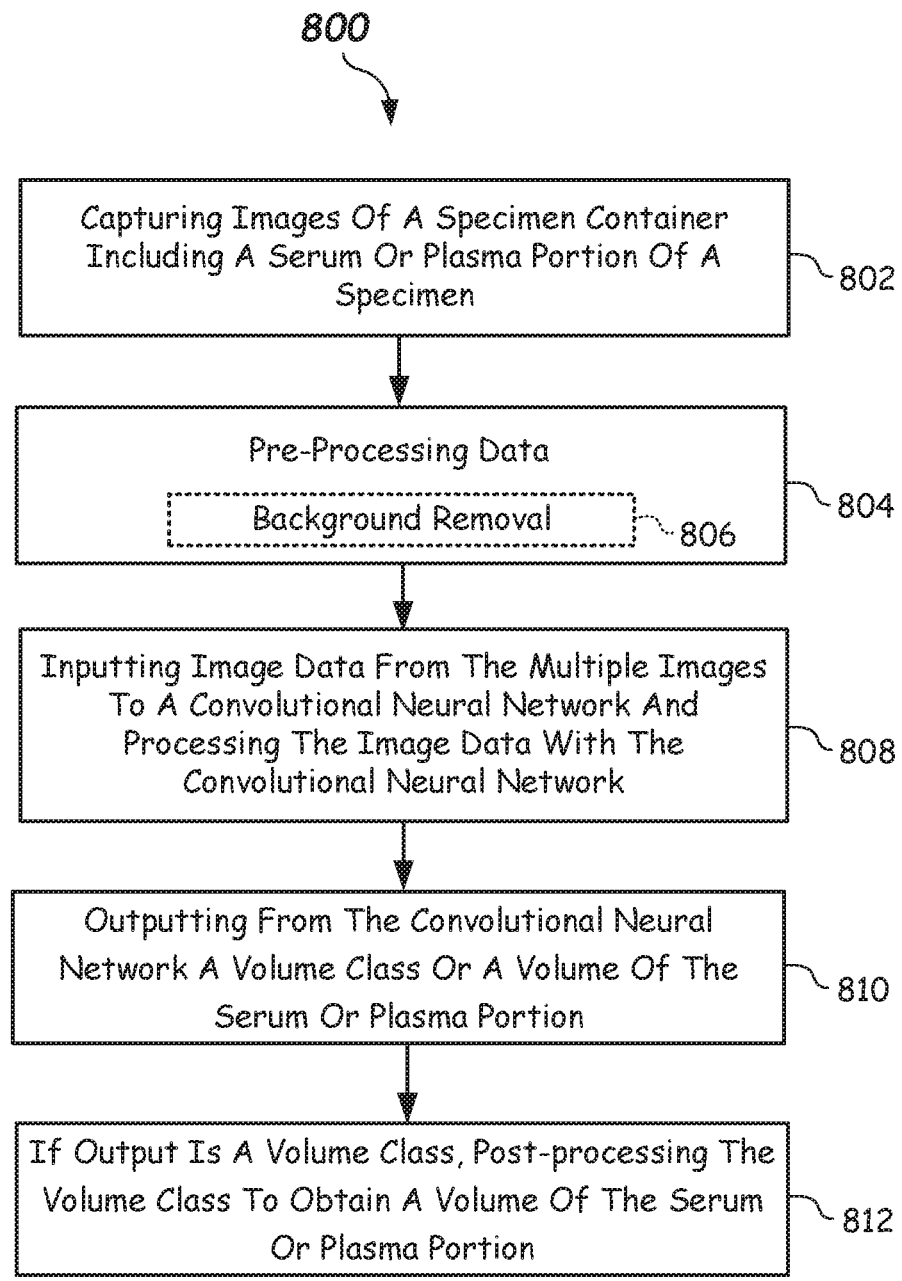
FIG. 8 is flowchart of a method of quantifying volume of a specimen according to one or more embodiments.

A flowchart of a volume quantification method 800 according to one or more embodiments is shown in FIG. 8. First, the specimen container 102 including specimen 212, which may be carried by carrier 122, is provided at the imaging location 432 of a quality check module (e.g., quality check module 130). The quality check module 130 for training may be the same module that is used for testing. Multiple images of the specimen container 102 including the specimen 212 including the serum or plasma portion 212SP of the specimen 212 are captured at 802. The images may also include the settled blood portion 212SB and the gel separator 313 (if present). The multiple images may be multi-spectral images taken at multiple different exposures and at multiple different spectra as described herein. Moreover, the images may be captured from multiple viewpoints by different image capture devices 440A-4400, as described above.

For volume quantification, a backlighted setup of quality check module 130 may be used, and the multiple images may be stored in memory of the computer 143. From these images, in the pre-processing data of 804, background may optionally be removed in a background removal of 806 to lower computational burden. Background removal in 806 may be accomplished by subtracting corresponding reference images previously taken (e.g., in 506—See FIG. 5A). Thus, removal of the background leaves only data associated with the foreground for processing and reduces overall computation.

In the pre-processing data of 804, the data for each image data set at each wavelength of illumination (e.g., the 4-8 exposures) may be consolidated. The consolidation involves the selection of optimally-exposed pixels per exposure and consolidating all selected image data into one image data set per wavelength and for each viewpoint and then normalizing all the selected data as discussed above. During image consolidation process, the various exposure images at each spectrum (R, G, and B) and for each image capture device 440A-440C are reviewed pixel-by-pixel to determine those pixels that have been optimally exposed. For each corresponding pixel location, the best of any optimally-exposed pixel is selected and normalized and included in the optimally-exposed image data set for each spectrum and image capture device 400A-4400. Thus, following image consolidation in pre-processing data 804, there is produced one optimally-exposed image data set for each spectrum (R, G, and B) and for each image capture device 440A-4400. The use of HDR image processing may function to enrich the details of the images with respect to reflections and absorption. This may make volume quantification more precise.

In 808, the image data sets for each spectrum and each image capture 440A-440C are input to and operated on (processed) by the CNN 535, which has been appropriately trained in the previous training method to be able to quantify volume of one or more components of the specimen 212.

As an output from the CNN 535, in 810, quantification of the volume of one or more components of the specimen 212 may be determined. In some embodiments, the output from the $CNN_A$ is a volume class of the serum or plasma portion 212SP (See FIG. 5B). In another embodiment, the output from $CNN_B$ is a volume class of the settled blood portion 212SBP (see FIG. 5C). In yet another embodiment, the output from $CNN_C$ is a volume class of the gel separator 313 (See FIG. 5C). In another embodiment, the $CNN_B$ configured to output a volume class of the settled blood portion 212SBP may be configured as a stand-alone model like FIG. 5B. In another embodiment, the $CNN_C$ configured to output a volume class of the gel separator 213 may be configured as a stand-alone model like FIG. 5B.

In some embodiments, the output from the CNN 635B is a volume of the serum or plasma portion 212SP (See FIG. 6B). An identical CNN could be configured to output a volume of the settled blood portion 212SBP as a stand-alone model like FIG. 6B. Likewise, an identical CNN could be configured to output a volume of the gel separator 213.

In 812, when the output from the $CNN_A$ is a volume class, then post-processing of the volume class of the specimen that is output from the $CNN_A$ 535 is provided to obtain a volume of the serum or plasma portion 212SP. Post processing may be accessing a look-up table 539 as shown in FIG. 5E to determine the actual volume value of the serum or plasma portion 212SP in the specimen 212. Similar look-up tables 539A, 539B, 539C can be accessed to determine the actual volume value of the serum or plasma portion 212SP, actual volume value of the settled blood portion 212SB, and actual volume value of the gel separator 313 as shown in FIG. 5C when the CNN 535 includes the form of one consolidated network. Thus, it should be understood that the method 800 described in FIG. 8 is equally applicable to determination of the volume of the settled blood portion 212SB or the gel separator 313. Simply exchange the words "Serum or Plasma Portion" in FIG. 8 with "settled blood portion" or "gel separator."

While the quality check module 130 has been shown in FIG. 1 as being located such that pre-screening is performed immediately after centrifugation on the centrifuge 125, it may be advantageous to include this feature directly on an analyzer (e.g., analyzer 106, 108, and/or 110) in some embodiments, or elsewhere along the track 121. Furthermore, in some embodiments, the centrifugation may be performed prior to loading the racks 104 into the loading area 105, so that in some embodiments, the quality check module 130 may be located at the loading area 105 and the quality check can be carried out as soon as the robot 124 loads a specimen container 102 into a carrier 122 or even before that.

While the disclosure is susceptible to various modifications and alternative forms, specific system and apparatus embodiments and methods thereof have been shown by way of example in the drawings and are described in detail herein. It should be understood, however, that it is not intended to limit the disclosure to the particular apparatus or methods disclosed but, to the contrary, the intention is to cover all modifications, equivalents, and alternatives falling within the scope of the claims.

What is claimed is:

1. A method of quantifying a specimen, comprising:
   providing a specimen container at an imaging location, the specimen container containing the specimen;
   capturing multiple high dynamic range images of the specimen and storing the multiple high dynamic range images as image data;
   processing the image data with a neural network, the neural network comprising a plurality of convolution and pooling layer pairs; and
   classifying the specimen with the neural network into one of:
   a plurality of volume classes, and
   a volume of the specimen.

2. The method of claim 1 wherein the capturing multiple high dynamic range images comprises capturing a series of images of the specimen at multiple spectra having different nominal wavelengths.

3. The method of claim 2 wherein the series of images comprises multiple different exposures at each of the different nominal wavelengths.

4. The method of claim 3 comprising selecting optimally-exposed pixels from the multiple high dynamic range images at the multiple different exposures and at each of the multiple spectra to generate optimally-exposed image data for each of the multiple spectra.

5. The method of claim 1, wherein the capturing multiple high dynamic range images is conducted from multiple different viewpoints, with an image capture device provided at each viewpoint.

6. The method of claim 5, wherein the number of the plurality of volume classes comprises between 10 and 1,000.

7. The method of claim 1, wherein the neural network comprises a convolutional neural network having a fully-connected layer following the plurality of convolution and pooling layer pairs.

8. The method of claim 1, wherein the neural network is trained from multiple training sets, wherein each training set of the multiple training sets comprises a training image and a scalar volume annotation for each of the plurality of volume classes.

9. The method of claim 8, wherein the scalar volume annotation is a volume or of one or more of a serum or plasma portion, a settled blood portion, and a gel separator.

10. The method of claim 1, wherein the one of the plurality of volume classes is mapped to a volume by a look-up table.

11. The method of claim 10, determining a ratio of a volume of serum or plasma portion to a volume of a settled blood portion from determined volumes.

12. The method of claim 1, wherein the neural network is configured and trained to determine a volume class of a serum or plasma portion, a settled blood portion, or a gel separator.

13. The method of claim 1, wherein the neural network is configured and trained to determine a volume class of a serum or plasma portion.

14. The method of claim 1, wherein the neural network is configured and trained to determine a volume class of a settled blood portion.

15. The method of claim 1, comprising:
identifying a volume of the serum or plasma portion that is contained in the specimen container.

16. The method of claim 1, comprising:
identifying a volume of the settled blood portion that is contained in the specimen container.

17. The method of claim 1, comprising:
identifying a volume of a gel separator that is contained in the specimen container.

18. The method of claim 1, wherein the neural network comprises a pool layer, a convolution layer, and a soft max layer.

19. A quality check module, comprising:
one or more image capture devices configured to capture images of the specimen at multiple spectra having different nominal wavelengths, at multiple exposures, and from one or more viewpoints; and
a computer operatively coupled to the one or more image capture devices and operable to:
select optimally-exposed pixels from the images at the different exposures and at each of the multiple spectra and generate optimally-exposed image data for each of the multiple spectra,
process the image data with a neural network, the neural network comprising a plurality of convolution and pooling layer pairs; and
classify the specimen with the neural network into one of:
a plurality of volume classes, and
a volume of the specimen.

20. A specimen testing apparatus, comprising:
a track; and
a quality check module on the track, the quality check module including:
one or more image capture devices configured to capture images of the specimen at multiple spectra having different nominal wavelengths, at multiple different exposures, and from one or more viewpoints, and
a computer configured and operable to:
select optimally-exposed pixels from the images at the multiple different exposures at each of the multiple spectra to generate optimally-exposed image data for each of the multiple spectra and viewpoint,
process the image data with a neural network, the neural network comprising a plurality of convolution and pooling layer pairs; and
classify the specimen with the neural network into one of:
a plurality of volume classes, and
a volume of the specimen.

* * * * *